Figure 1:
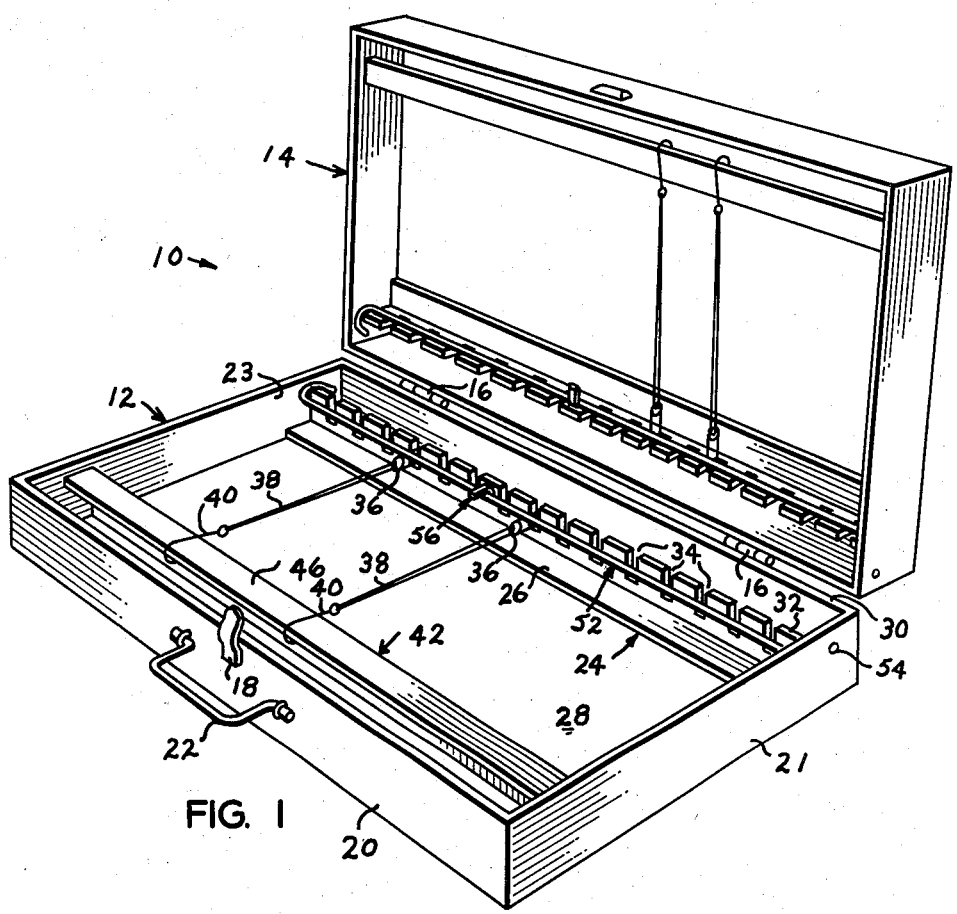

Sept. 2, 1958  F. K. FISHER ET AL  2,849,829
TROTLINE LEADER AND HOOK CARRYING CASE
Filed Dec. 24, 1956

Frank K. Fisher
Cecil L. Fisher INVENTORS

BY Loyal J. Miller
ATTORNEY

United States Patent Office 2,849,829
Patented Sept. 2, 1958

2,849,829

TROTLINE LEADER AND HOOK CARRYING CASE

Frank K. Fisher, Oklahoma City, and Cecil L. Fisher, Yukon, Okla.

Application December 24, 1956, Serial No. 630,161

2 Claims. (Cl. 43—57.5)

The present invention relates to an improvement in holders for fishing trotlines, and more particularly to a holder or case for carrying trotline hooks and their attached leaders.

A trotline comprises a relatively long length of fishing line to which is attached a plurality of hooks at frequent intervals by means of leaders or short lengths of line. It is desirable to remove these leaders and the attached hooks from the line when not in use or when moving the line from one fishing location to another in order to prevent the hooks and lines from becoming entangled and the danger thereby incurred. Even when disconnected from the trotline the hooks and leaders tend to become entwined to such an extent that in a bundle of one hundred hooks or more it may take an hour or more to separate them.

It is therefore the principal object of this invention to provide a means for storing or transporting the leaders and attached hooks which will prevent the same from becoming entangled.

Another object of this invention is to provide a carrying case for trotline leaders and hooks which will hold the hooks and leaders in spaced-apart parallel relation and thus permits the leaders to dry more readily.

An additional object is to provide a carrying case of this class which will hold a plurality of trotline leaders and their attached hooks in such a manner that each and every one of the leaders and respective attached hook may be selectively removed from the case as needed without disturbing the remaining leaders or hooks.

A further object is to provide a device of this character which is relatively small and light of weight and which may therefore be easily carried by one hand.

Yet another object is to provide a case of this class which will permit the trotline leaders to dry evenly and straight.

Still another object is to provide a carrying case of this nature which will securely retain the hooks and leaders therein in a safe manner and thus precludes accidental snagging of the barbed ends of the hooks in the fisherman's clothing or flesh.

The present invention accomplishes these and other objects by providing a pair of comparatively shallow rectangular trays which are co-operatively hingedly connected together along one longitudinal side thus forming a container or case. A latch and handle connected to the sides of the trays opposite the hinged side provides means for carrying the case. Each of the trays are provided with a pair of longitudinally extending partitions adjacent each longitudinal side for engaging and holding the opposing ends of trotline leaders and hooks in spaced parallel relation.

Figure 2:
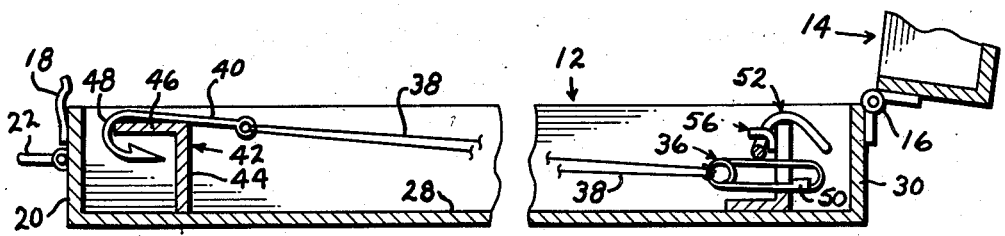

Other objects will be apparent from the following description when taken in conjunction with the accompanying one sheet of drawings, wherein:

Figure 1 is a perspective view of the device in opened position; and Figure 2 is a fragmentary vertical cross sectional view of the device as seen in Fig. 1.

Like characters of reference designate like parts in those figures of the drawings in which they occur.

In the drawings—

The reference numeral 10 indicates the device, as a whole, which is rectangularly box-like in general figuration and includes a pair of substantially identical comparatively shallow trays 12 and 14 which are connected along one longitudinal edge by hinges 16 disposing the open sides or faces in co-operatingly aligned relation to form a closed case or container when the two trays are pivoted together. A spring clip or latch 18 connected to the longitudinal side 20 of the tray 12 holds the trays in closed position. A handle 22 is connected to side 20 of the tray 12 for carrying the device.

The trays 12 and 14 are substantially identical in construction and to avoid needless repetition only the tray 12 will be described in detail.

The tray 12 is longitudinally partitioned by a first right angular partition member 24 extending between the tray ends 21 and 23 and having one flange 26 flatly connected to the bottom 28 of the tray in spaced-apart parallel relation with its longitudinal hinged side 30 thus disposing the other flange 32 of the partition 24 substantially perpendicular with relation to the bottom 28. The flange 32 is provided with a plurality of transverse longitudinal equally spaced-apart slots 34 for receiving a trotline leader clip 36 within each slot. The clip 36 is conventional in fishing equipment and is connected to the end of a short section of line or leader 38 opposite a fishhook 40. The purpose of the clips 36 is to permit the leaders 38 and hooks 40 to be readily connected to or disconnected from a trotline, not shown. The width of the slots 34 and the spacing between the same is shown in exaggerated relation for clarity and it is to be understood that the slots 34 need only be of a width sufficient to freely receive the wire-like clips 36 therein when the same is disposed vertically edgewise.

A second right angular partition member 42 extending between the ends 21 and 23 of the tray has one flange 44 connected perpendicularly to the bottom 28 in parallel spaced-apart relation with the side 20. The other flange 46 of the partition 42 projects toward the side 20 in parallel spaced relation above the bottom 28.

Operation

In operation the barbed end 48 of a fishhook 40 is engaged over the free edge of the flange 46 thus placing the barb of the hook under the flange and substantially flatly supporting the shank of the hook on the upper surface of the flange. The leader clip 36 connected to the end of the leader 38 opposite the hook 40 is then placed within one of the slots 34 in substantial alignment with the position of the hook on the flange 46. The spacing between the partitions 24 and 42 is preferably such that the leader 38 is placed under a slight tension so that the leaders will dry straight and will not become entangled with adjacent leaders. The clips 36 have a small locking lip 50 at the openable end of the clip which prevents the same from sliding longitudinally out of engagement with the slots 34. To prevent the clips 36 from slipping out of the open end of the slots 34 we have provided a locking means comprising an elongated rod-like member 52 pivotally connected at each end as at 54, to the respective ends 21 and 23 of the tray 12. The member 52 is arcuately curved adjacent each end of the tray so that its longitudinal intermediate length bears against one side of the flange 32 above the clips 36. The member 52 is held or locked in this clip retaining position by a hook shaped member 56 rigidly carried by the flange 32 intermediate its ends. The member 52 is engaged under and removed from engagement with the hook shaped member 56 by manually springing the same outwardly beyond the free end of the hook shaped member. When installing or removing the clips 36 the member 52 is pivoted at its points of connection 54 toward the side 30.

Obviously additional trays, identical in construction with relation to the trays 12 and 14, may be hingedly connected to the trays shown to provide additional hook and leader storage space if desired.

Obviously the invention is susceptible to some change or alteration without defeating its practicability, and we therefore do not wish to be confined to the preferred embodiment shown in the drawings and described herein, further than we are limited by the scope of the appended claims.

We claim:

1. A trotline leader and hook carrying case, comprising: a pair of shallow rectangular trays hingedly connected together along one longitudinal side for forming a closed container; a first partition, right angular in cross section, having one flange thereof rigidly connected flatly to the bottom of each said tray, respectively, in spaced-apart relation with the hinged side of the latter, the upwardly disposed flange of each of said first partitions having a plurality of longitudinally spaced-apart slots therein adapted to receive a like plurality of trotline leader clips; and a second partition, right angular in cross section, having one flange thereof rigidly connected perpendicularly to the bottom of each said tray, respectively, in spaced-apart relation with the side of the tray opposite the hinged side, the other flange of said second partitions projecting toward the side of each respective tray opposite the hinged side in spaced-apart parallel relation with the bottom side of the trays for engaging and supporting trotline hooks, the spacing between said first and said second partitions being substantially equal with relation to the length of the trotline leaders to be carried, whereby trotline leaders having hooks and clips attached to the respective ends thereof are received by said first and said second partitions in spaced-apart parallel relation for drying and carrying.

2. Structure as specified in claim 1 and locking means carried by each of said trays adjacent the hingedly connected side for holding trotline leader clips within the slots in said first partitions, said locking means including an elongated rod-like member pivotally connected at each end to the respective ends of each said tray adjacent its hinged side, said rod-like members adapted to lie against one side of the slotted flange of each respective said first partitions; and a hook shaped member rigidly carried by the slotted flange of each said first partition intermediate its ends for holding said rod-like member against pivotal movement.

References Cited in the file of this patent

UNITED STATES PATENTS

| | | |
|---|---|---|
| 578,458 | Knieriemen | Mar. 9, 1897 |
| 639,030 | Haak | Dec. 12, 1899 |
| 2,173,363 | Hillmer | Sept. 19, 1939 |
| 2,578,181 | Edmunds | Dec. 11, 1951 |